United States Patent
Liao et al.

(10) Patent No.: US 11,221,743 B2
(45) Date of Patent: Jan. 11, 2022

(54) INFORMATION PROCESSING METHOD, TERMINAL, SERVER, AND COMPUTER STORAGE MEDIUM

(71) Applicant: Tencent Technology (Shenzhen) Company Limited, Shenzhen (CN)

(72) Inventors: Mengxi Liao, Shenzhen (CN); Jing Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 27 days.

(21) Appl. No.: 16/918,406

(22) Filed: Jul. 1, 2020

(65) Prior Publication Data

US 2020/0333930 A1    Oct. 22, 2020

Related U.S. Application Data

(63) Continuation of application No. 16/205,791, filed on Nov. 30, 2018, now Pat. No. 10,739,956, which is a (Continued)

(30) Foreign Application Priority Data

Aug. 29, 2016  (CN) .......................... 201610751859.5

(51) Int. Cl.
*G06F 3/048* (2013.01)
*G06F 3/0484* (2013.01)
(Continued)

(52) U.S. Cl.
CPC ....... *G06F 3/0484* (2013.01); *G06Q 30/0277* (2013.01); *H04L 67/26* (2013.01); *H04L 67/2823* (2013.01)

(58) Field of Classification Search
CPC ... G06F 3/0484; H04L 67/26; H04L 67/2823; G06Q 30/0277
See application file for complete search history.

(56) References Cited

U.S. PATENT DOCUMENTS

2002/0103900 A1    8/2002   Cornelius et al.
2003/0212770 A1    11/2003  Kotnur et al.
(Continued)

FOREIGN PATENT DOCUMENTS

| CN | 104199669 A | 12/2014 |
| CN | 105117187 A | 12/2015 |
| CN | 105610954 A | 5/2016 |

OTHER PUBLICATIONS

Tencent Technology, ISRWO, PCT/CN2017/099165, Dec. 1, 2017, 6 pgs.

(Continued)

*Primary Examiner* — Dong U Kim
(74) *Attorney, Agent, or Firm* — Morgan, Lewis & Bockius LLP

(57) ABSTRACT

Embodiments of this application disclose an information processing method, a terminal, a server, and a non-transitory computer readable storage medium. The method includes: in response to starting an application management tool, obtaining one or more application-specific parameters associated with the terminal; sending the one or more application-specific parameters to a remote server; receiving, from the remote server, media information that matches the one or more application-specific parameters; in response to a user selection of a first area of the application management tool, generating a first instruction for shutting down applications running on the terminal; and performing the first instruction for shutting down the applications running on the terminal while presenting the media information in the first area.

20 Claims, 13 Drawing Sheets

Related U.S. Application Data continuation-in-part of application No. PCT/CN2017/099165, filed on Aug. 25, 2017.

(51) Int. Cl.
*H04L 29/08* (2006.01)
*G06Q 30/02* (2012.01)

(56) References Cited

U.S. PATENT DOCUMENTS

| | | |
|---|---|---|
| 2007/0143713 A1 | 6/2007 | Hosoki et al. |
| 2010/0273450 A1 | 10/2010 | Papineau et al. |
| 2011/0296416 A1* | 12/2011 | Kim .................... G06F 3/04842 718/100 |
| 2012/0042003 A1 | 2/2012 | Goetz et al. |
| 2012/0297400 A1 | 11/2012 | Hill et al. |
| 2013/0167058 A1* | 6/2013 | LeVee .................... G06T 13/80 715/768 |
| 2014/0006347 A1 | 1/2014 | Qureshi et al. |
| 2015/0106728 A1 | 4/2015 | Botzer |
| 2015/0213490 A1 | 7/2015 | Oikonomidis |
| 2016/0062793 A1 | 3/2016 | Chu |
| 2017/0199733 A1 | 7/2017 | Li et al. |
| 2019/0132381 A1 | 5/2019 | Momchilov et al. |

OTHER PUBLICATIONS

Tencent Technology, IPRP, PCT/CN2017/099165, Mar. 5, 2019, 5 pgs.

\* cited by examiner

FIG. 6

INFORMATION PROCESSING METHOD, TERMINAL, SERVER, AND COMPUTER STORAGE MEDIUM

CROSS-REFERENCE TO RELATED APPLICATIONS

This application is a continuation application of U.S. application Ser. No. 16/205,791, entitled "INFORMATION PROCESSING METHOD, TERMINAL, SERVER AND COMPUTER STORAGE MEDIUM" filed on Nov. 30, 2018, which is a continuation-in-part application of PCT/CN2017/099165, entitled "INFORMATION PROCESSING METHOD, TERMINAL, SERVER AND COMPUTER STORAGE MEDIUM" filed on Aug. 25, 2017, which claims priority to Chinese Patent Application No. 201610751859.5, filed with the State Intellectual Property Office of the People's Republic of China on Aug. 29, 2016, all of which are incorporated herein by reference in their entirety.

FIELD OF THE TECHNOLOGY

This application relates to information processing technologies, and in particular, to an information processing method, a terminal, a server, and a computer storage medium.

BACKGROUND OF THE DISCLOSURE

Generally, most tool applications all have a media information presentation function. Specifically, the applications may be management-type applications, of terminals, for supporting functions such as installation and offloading of applications in the terminals and space cleaning of the terminals. Media information content includes, for example, advertisement content. On one hand, most media information in tool applications is presented by using a title bar, that is, presented by using a newly added rectangular area. On the other hand, the tool applications generally have no media information platform, that is, the media information presented in the tool applications is not controlled by the tool application parties, leading to relatively low controllability and a low hit rate of the media information.

SUMMARY

To resolve the existing technical problems, embodiments of this application provide an information processing method, a terminal, and a server.

To achieve the foregoing objective, the technical solutions in the embodiments of this application are implemented as follows:

An embodiment of this application provides an information processing method performed at a terminal having one or more processors and memory storing a plurality of programs to be executed by the one or more processors, the method comprising:

in response to starting an application management tool, obtaining one or more application-specific parameters associated with the terminal;

sending the one or more application-specific parameters to a remote server;

receiving, from the remote server, media information that matches the one or more application-specific parameters;

in response to a user selection of a first area of the application management tool, generating a first instruction for shutting down applications running on the terminal; and performing the first instruction for shutting down the applications running on the terminal while presenting the media information in the first area.

An embodiment of this application further provides a terminal, including: one or more processors, memory and a plurality of programs stored in the memory that, when executed by the one or more processors, cause the terminal to perform the aforementioned information processing method.

An embodiment of this application further provides a non-transitory computer readable storage medium, storing computer executable instructions, and the computer executable instructions, when executed by a terminal having one or more processors, cause the terminal to perform the information processing method applied to a terminal according to the embodiments of this application.

According to the information processing method, the terminal, the server, and the computer the storage medium that are provided in the embodiments of this application, on one hand, media information is presented in a first area that is inherent in a tool application, so that a user can view the pushed media information in a process of performing a corresponding function by the tool application, and there is no need to newly add an area to present the media information, thereby improving the user experience. On the other hand, a newly added media information platform (server) matches the delivered media information with user attribute information, so as to improve the accuracy of media information push, improve the hit rate of the media information, and improve the controllability of the media information push.

BRIEF DESCRIPTION OF THE DRAWINGS

FIG. 6 is a schematic diagram of configuration according to an embodiment of this application;

DESCRIPTION OF EMBODIMENTS

This application is further described below in detail with reference to the accompanying drawings and specific embodiments.

Figure 1:
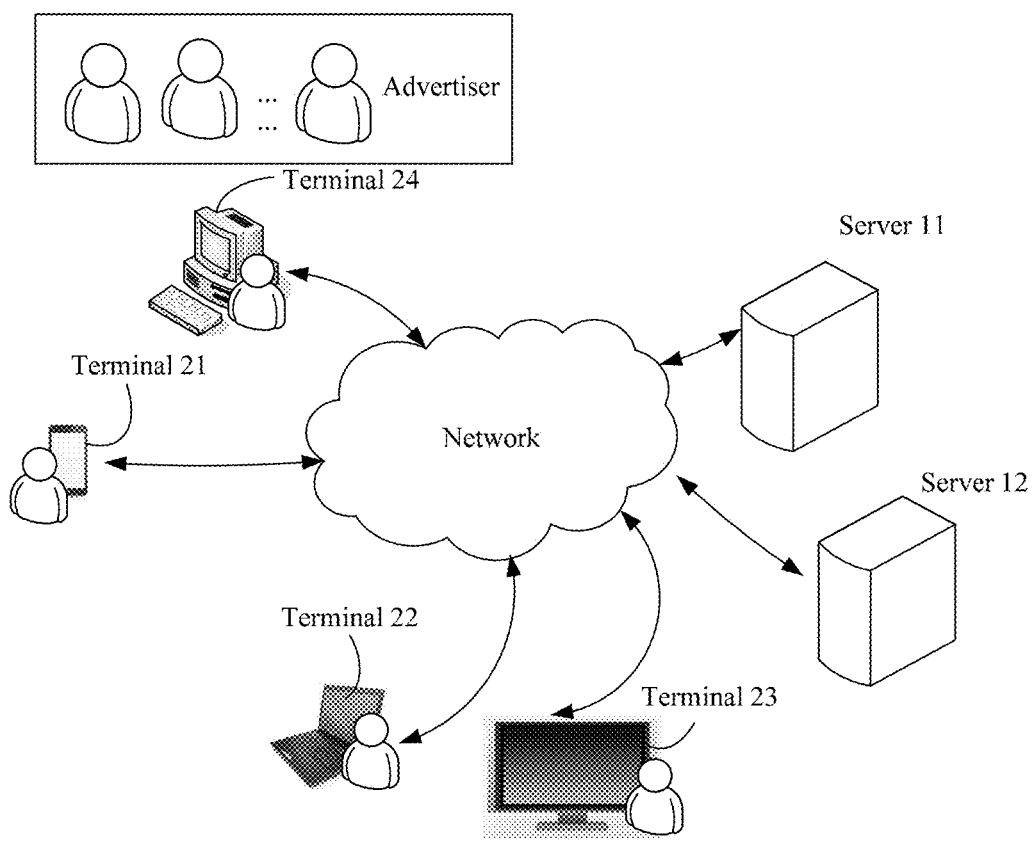
FIG. 1 is a schematic diagram of hardware entities performing information exchange according to an embodiment of this application.

FIG. 1 is a schematic diagram of hardware entities performing information exchange according to an embodiment of this application. FIG. 1 includes servers 11 and 12 and terminal devices 21 to 24. The terminal devices 21 to 24 may exchange information with the server by using a wired network or a wireless network. The terminal devices 21 to 24 may include types such as a mobile phone, a tablet computer, a desktop computer, and an all-in-one machine. In this embodiment, the server 11 and the server 12 are two types of servers or server clusters. In an example, the server 11 used as a first-type server may be a server corresponding to a tool application, and the tool application may be installed and run in a terminal device. The server 12 used as a second-type server is a server or a server cluster that corresponds to a media information platform, and media information content may be specifically advertisement content. The server 11 and the server 12 may communicate with each other through a network. The terminal devices 21 to 24 may include a first-type terminal (for example, a terminal of an advertiser, or referred to as an object providing an advertisement material and content push). In an example, the server 11 may further exchange information with the first-type terminal (for example, a terminal of an advertiser, or referred to as an object providing an advertisement material and content push) through a network. After the first-type terminal (for example, a terminal of an advertiser, or referred to as an object providing an advertisement material and content push) submits, to the server 12, an advertisement required to be pushed, the advertisement is stored in the server 12, and a manager may be configured to perform a series of processing procedures such as checking on the advertisement pushed by the first-type terminal (for example, a terminal of an advertiser, or referred to as an object providing an advertisement material and content push). Compared with the first-type terminal (for example, a terminal of an advertiser, or referred to as an object providing an advertisement material and content push), the terminal devices 21 to 24 may further include a second-type terminal (for example, a terminal of a common user, or referred to as an object to which an advertisement is presented or exposed). A tool application may run in the second-type terminal, and an advertisement may be added to the tool application to present more recommended information to the user.

The example in FIG. 1 is merely an example of a system architecture for implementing the embodiments of this application, and the embodiments of this application are not limited to the system architecture shown in FIG. 1. The embodiments of this application are proposed based on the system architecture.

Figure 2A:
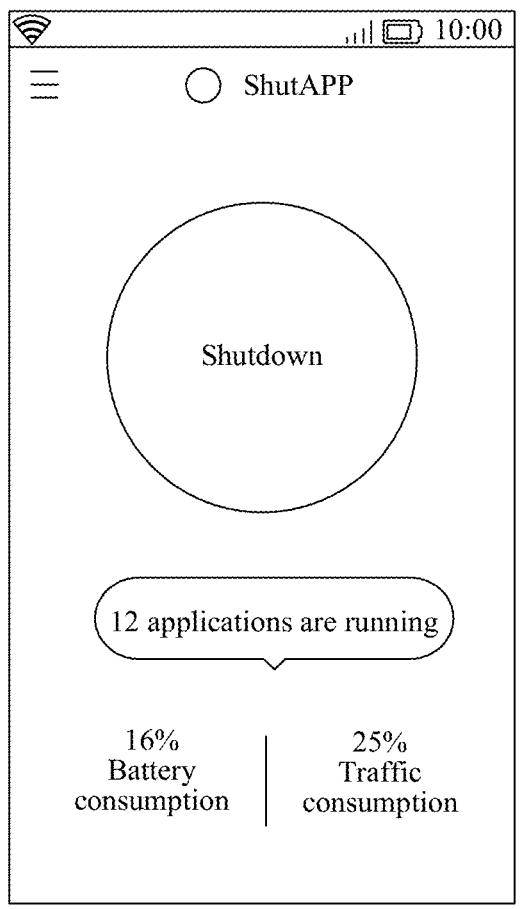
FIG. 2a to FIG. 2d are a schematic diagram of a tool application that can run in a second-type terminal.
Figure 2B:
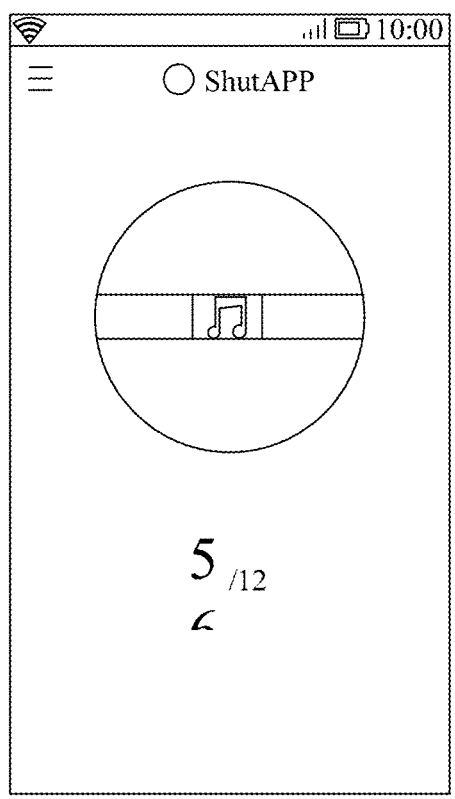
Figure 2C:
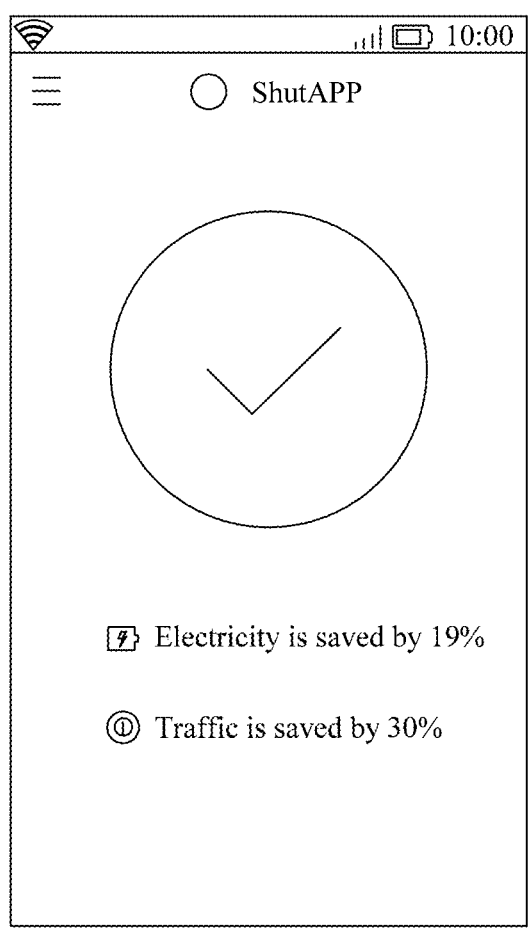
Figure 2D:
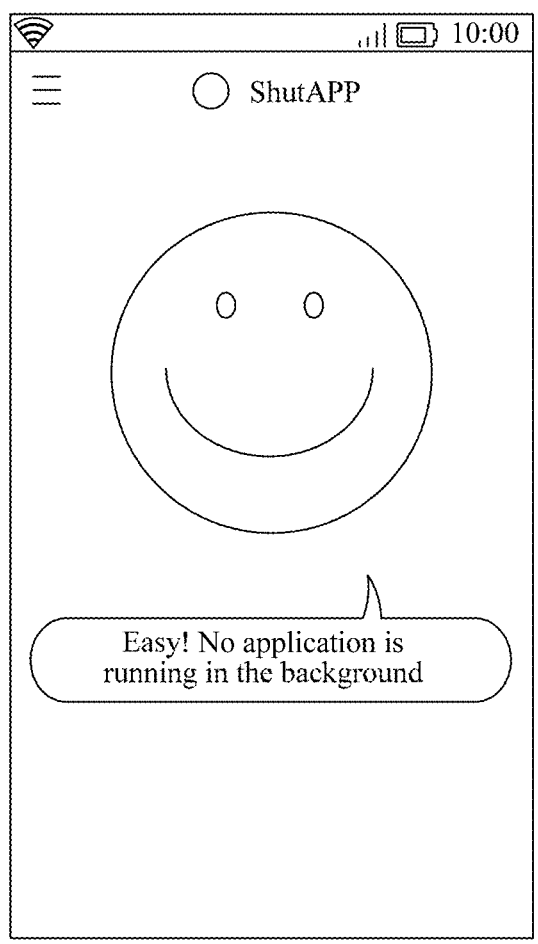

In an example, a tool application running in the second-type terminal may be a tool application supporting an application shutdown function, so as to free a memory of the terminal device and prolong the service life of a battery. An example in which the tool application is an application for shutting down a program (ShutAPP) running in a background of a mobile phone is used. FIG. 2a to FIG. 2d are a schematic diagram of a tool application that can run in a second-type terminal. As shown in FIG. 2a, FIG. 2a shows a current status of a terminal device before a tool application is used to shut down an application. For example, a display interface of the tool applications displays that there currently are 12 applications running in the background, the battery electricity consumes 16%, and traffic consumes 25%. A function area, for example, a circular area displayed with an "shutdown" identifier shown in FIG. 2a, is provided in the display interface of the tool application. When the circular area is triggered, an instruction is generated, and the 12 applications currently running in the background are shut down according to the instruction. As shown in FIG. 2b, in a process of shutting down the 12 applications one by one, the display interface of the tool application dynamically displays the number of applications that has been shut down. For example, an identification word "5/12" indicates that a fifth application has been currently shut down. Correspondingly, when a sixth application is shut down, "6/12" is displayed in the display interface. On the other hand, an identifier of an application that is currently shut down is dynamically displayed in the circular area. For example, as shown in FIG. 2b, the fifth application is currently being shut down, and the fifth application is a music-type application corresponding to a music identifier displayed in the circular area. After all the 12 applications are shut down, as shown in FIG. 2c, an "√" identifier is displayed in the circular area, to indicate that all the 12 applications currently running in the background are shut down, and words that "electricity is saved by 19%" and "traffic is saved by 30%" are displayed. Finally, the display interface of the tool application is shown in FIG. 2d. It indicates that there is no application running in the background.

An information processing method in the embodiments of this application may be applied to the tool-type application shown in FIG. 2a to FIG. 2d.

Figure 3:
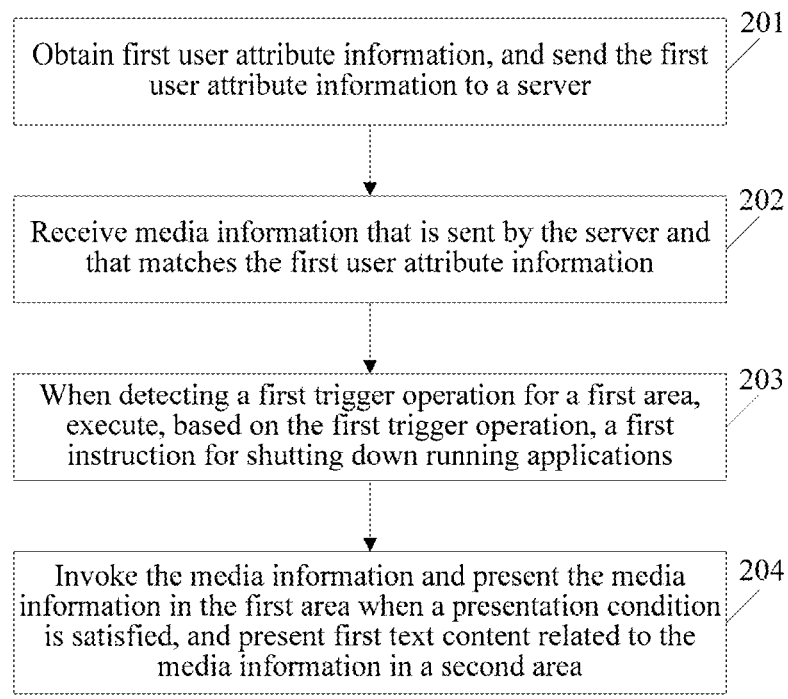
FIG. 3 is a schematic flowchart 1 of an information processing method according to an embodiment of this application.

An embodiment of this application provides an information processing method, applied to a terminal. FIG. 3 is a schematic flowchart 1 of an information processing method according to an embodiment of this application. As shown in FIG. 3, the method includes the following steps:

Step 201: A terminal obtains first user attribute information, and sends the first user attribute information to a server.

Step 202: Receive media information that is sent by the server and that matches the first user attribute information.

Step 203: When detecting a first trigger operation for a first area, execute, based on the first trigger operation, a first instruction for shutting down running applications.

Step 204: Invoke the media information and present the media information in the first area when a presentation condition is satisfied, and present first text content related to the media information in a second area.

In this embodiment, the first user attribute information may specifically include at least one the following information: country information, language information, resolution information, whether a terminal user is a game user, version information of a tool application, and the like. Specifically, for the country information, the terminal may learn of an operator of a Subscriber Identification Module (SIM) card, and identify the country information by using mobile country code (MCC). For the language information, the terminal may obtain system language information of the terminal device. For the resolution information, the terminal may obtain a resolution parameter stored in the terminal; or may obtain a width parameter and/or a length parameter of the terminal device, and determine the resolution information based on the obtained width parameter and/or the width parameter. For whether the terminal user is a game user, the terminal may communicate with an application market statistics platform, and obtain top N (N being a positive integer) game packet names in a game list in the application market statistics platform; and when a game installed in the terminal matches any one of the N game packet names, the terminal may determine that the terminal user is a game user. For the version information of the tool application, the terminal may directly obtain a version number of the tool application.

In this embodiment, the terminal receives the media information that is sent by the server and that matches the first user attribute information. The server matches the first user attribute information sent by the terminal with second user attribute information pre-configured for each piece of media information, and sends the matched media information to the terminal.

In an implementation, the receiving media information that is sent by the server and that matches the first user attribute information includes: receiving a first media information data packet that is sent by the server and that matches the first user attribute information, and parsing the first media information data packet, to obtain policy information and download address information; and obtaining the media information through downloading based on the download address information when detecting that a network environment satisfies the policy information.

In this embodiment, the terminal obtains the first media information data packet. The first media information data packet includes the policy information and the download address information, and the policy information is a policy in which the terminal downloads the media information based on the download address information. The policy information may specifically include a network environment allowing the terminal to download the media information based on the download address information. For example, if the network environment that is included in the policy information and that allows the terminal to download the media information based on the download address information is a Wireless-Fidelity (Wi-Fi) network environment, the terminal detects a current network environment based on the policy information; and if the terminal is in the Wi-Fi network environment, the terminal downloads the media information based on the download address information; or if the terminal is not in the Wi-Fi network environment, the terminal may further detect the network environment at preset time intervals (for example, one hour), to ensure to download the media information in the Wi-Fi network environment, and avoid a case in which a downloading process occupies excessive network traffic of a user.

When the information processing method in this embodiment of this application is applied to a tool application in the terminal, in an example, the tool application may be specifically a tool application used for shutting down an application running in a background shown in FIG. 2a to FIG. 2d. When the tool application runs in the terminal, a display interface of the terminal includes a first area, and the first area is an inherent area when the tool application runs. In an implementation, the first area may alternatively be a function key area. When the terminal detects a first input operation for the first area, the terminal generates a first instruction used for shutting down all applications in a running state, and shuts down all the currently running applications based on the first instruction.

In this embodiment, in a process in which the terminal executes the first instruction to shut down the running applications, the terminal detects whether the presentation condition is satisfied. When the presentation condition is satisfied, the terminal invokes the media information and presents the media information in the first area. The presentation condition being satisfied includes: determining that the presentation condition is satisfied when the number of running applications that are shut down by executing the first instruction reaches the pre-configured number of shutdown applications that is included in the media information.

After obtaining the media information sent by the server, the terminal parses the media information, to obtain a to-be-presented media information material and presentation policy information. The presentation policy information includes, for example, allowing to present the media information after at least three applications are shut down, allowing to present the media information after at least one application is shut down, or the like. The presentation policy information includes, for another example, the presentation number of the media information. For example, if the presentation policy information includes N game IPs, it indicates that a corresponding media material is presented for N times, where N may be a positive integer, and a value of N may be set based on an actual case. In the process of executing the first instruction to shut down the running applications, the terminal counts, based on the presentation policy information obtained through parsing, the number of running applications that are shut down. When the number of running applications that are shut down satisfies the presentation policy information, the terminal controls to present the media information material related to the media information in the first area, that is, present media information content in a particular area (which may be an area in which the function key is located or may not limited to the area in which the function key is located in this embodiment of the present disclosure) in the existing tool application.

Figure 4A:
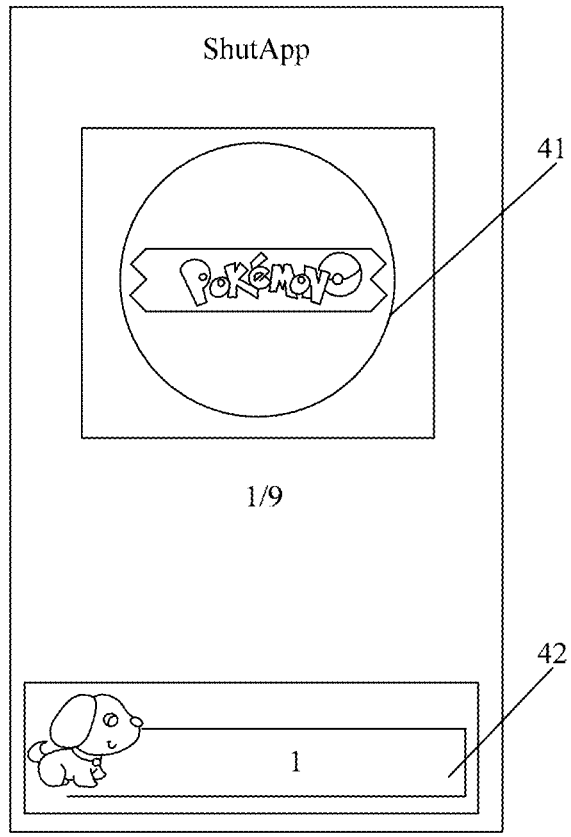
FIG. 4a to FIG. 4d are a schematic diagram of an application of a terminal according to an embodiment of this application.

FIG. 4a to FIG. 4d are a schematic diagram of an application of the terminal according to this embodiment of this application. An example in which a tool application is a ShutAPP application is still used. Specifically, referring to FIG. 4a, in a process in which the tool application shuts down nine applications that are running in a background, for example, as shown in FIG. 4a, when a first application in the nine applications is being shut down, a first area 41 of the tool the application presents media information content delivered by the server.

In this embodiment, the invoking the media information and present the media information in the first area includes: controlling, when executing the first instruction to shut down a first running application, a display status of the media information presented in the first area to change, to inform that the first running application has been shut down.

Figure 4B:
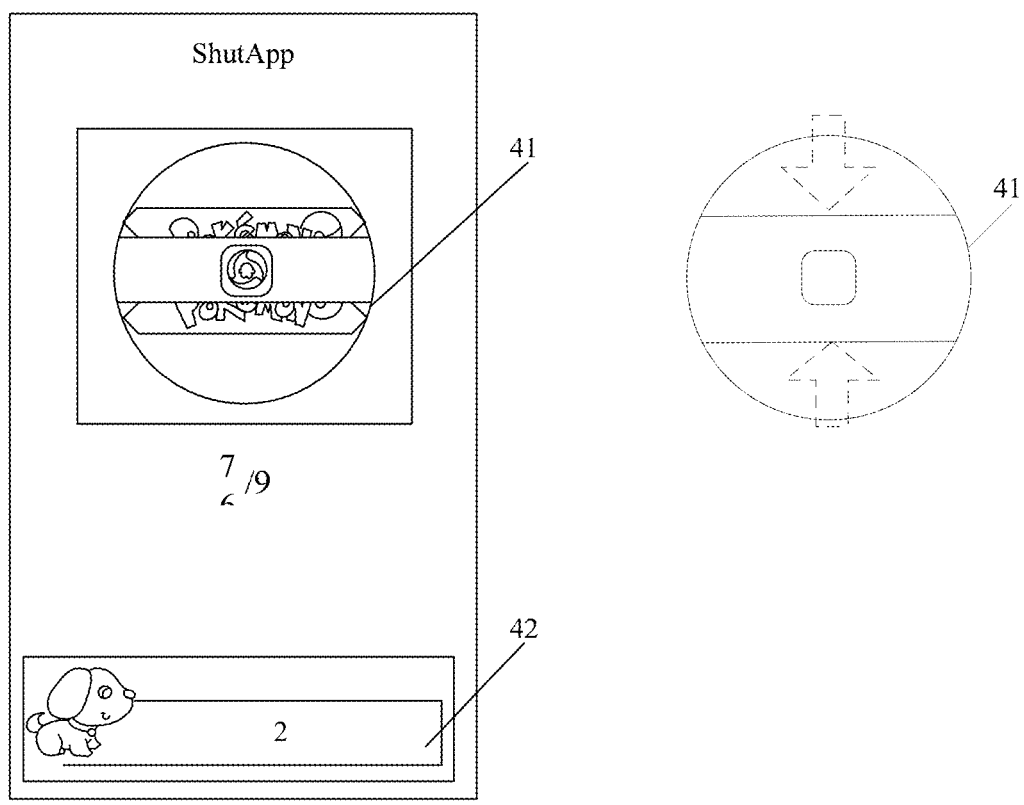

Specifically, in the process of controlling, by the terminal, to present the media information in the first area, the terminal further shuts down the running applications by using the tool application. In this embodiment, when the presentation condition is satisfied, that is, when the number of running applications that are shut down by executing the first instruction reaches the pre-configured number of shutdown applications that is included in the media information, for example, when the pre-configured number of shutdown applications in the media information is three, and when the number of running applications that are shut down by executing the first instruction reaches three, the display status of the media information presented in the first area is controlled to change. After the number of running applications that are shut down by executing the first instruction reaches the pre-configured number of shutdown applications, on one hand, the first area is used for presenting the media information; on the other hand, a user is informed by using the change of the display status of the media information that the running applications are shut down one by one. In an example, as shown in FIG. 4b, before the terminal invokes the media information and presents the media information in the first area 41, the first area 41 may display an identifier of an application that is currently to be shut down. The terminal may gradually enlarge presentation of the media information content through opposite motion of two controls at two opposite ends (for example, upper and lower ends or left and right ends shown in the figure) of the first area 41, in other words, the first area 41 includes two "gates" that can move oppositely; when the two "gates" gradually move towards a center from the two ends of the first area 41, the identifier of the to-be-shut down application that is originally presented is gradually covered by the presented media information; and when the presented identifier of the to-be-shut down application is totally covered by the media information, it indicates that the application that is currently to be shut down has been shut down. Certainly, an implementation in which the display status of the media information presented in the first area changes to inform that the first running application has been already shut down is not limited to the dynamic presentation manner shown in FIG. 4b. In another example, before the number of running applications that are shut down by executing the first instruction reaches the pre-configured number of shutdown applications, the user may be informed, through the change of the display status in the first area, that the running applications are being shut down one by one. For example, the terminal may indicate, through opposite motion of two controls at two opposite ends (for example, upper and lower ends or left and right ends shown in the figure) of the first area 41, that an application is already shut down. The number of shutdown applications is indicated by using the number of times of opposite motions of the two controls. On the other hand, the first area may further present an identifier of an application that is being shut down and the like.

In this embodiment, when the presentation condition is satisfied, in addition to presenting the media information in the first area, the terminal further controls to present the first text content related to the media information in the second area. Using FIG. 4a and FIG. 4b as an example, the first text content related to the media information is presented in a second area 42. In an example, each time a running application is shut down by executing the first instruction, or each time the display status of the media information presented in the first area 41 is changed, the first text content that is related to the media information and that is presented in the second area 42 also changes. For example, the first text content presented in the second area 42 shown in FIG. 4a is indicated by 1, and the first text content presented in the second area 42 shown in FIG. 4b may be indicated by 2. Further, all first text content presented in the second area 42 has continuity. It may be understood that the first text content sequentially presented in the second area 42 has continuity and has a complete story line from shutdown of a first running application to shutdown of a last running application. On one hand, images of the media information can be seen. On the other hand, narrative text content related to the media information can also be seen. The media information is presented in the process of shutting down the applications, so as to provide better user experience and attract more interest from the user, so that the hit rate of the media information is improved to some extent, the conversion rate of the media information is improved, and earnings of an advertiser are improved.

In an implementation, when all the running applications are shut down by executing the first instruction, the method further includes: controlling the media information presented in the first area to be dynamically presented, and presenting first link content related to the media information in a third area, where the first link content is used for connecting to a download interface of the media information.

Figure 4C:
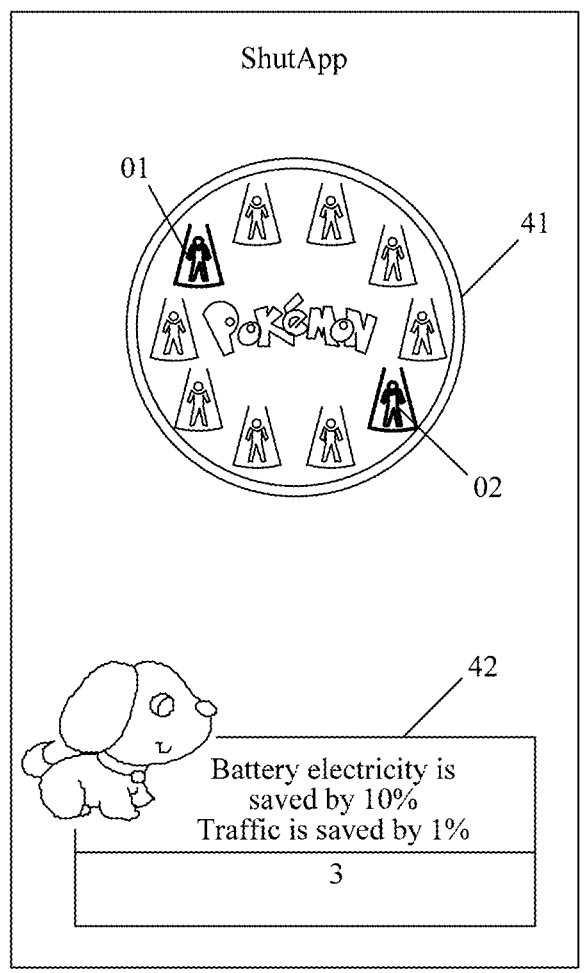
Figure 4D:
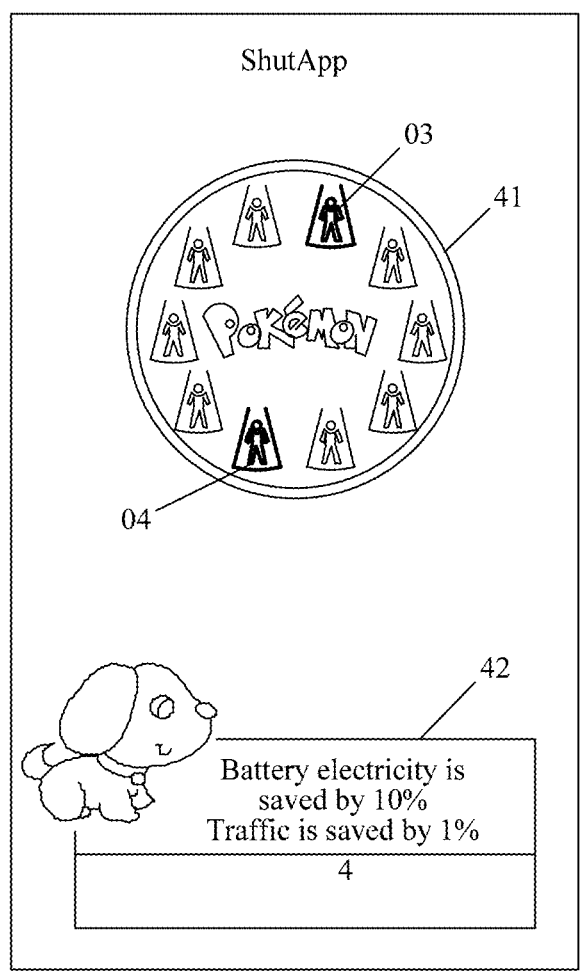

Specifically, after all the running applications are shut down, the terminal controls the media information presented in the first area to be dynamically presented. In an example, the media information presented in the first area includes at least two resource identity objects. Displaying effects of the at least two resource identity objects are changed at each preset time interval. For example, as shown in FIG. 4c and FIG. 4d, in a status shown in FIG. 4c, displaying brightness of a first virtual identity object 01 and displaying brightness of a second virtual identity object 02 are greater than brightness of other virtual identity objects, so that the first virtual identity object 01 and the second virtual identity object 02 are highlighted. After a preset time, in a status shown in FIG. 4d, displaying brightness of a third virtual identity object 03 and displaying brightness of a fourth virtual identity object 04 are greater than brightness of other virtual identity objects, so that the third virtual identity object 03 and the fourth virtual identity object 04 are highlighted, that is, in a time period, the media information that is presented in the first area and that is seen by the user is dynamically displayed. Certainly, in this embodiment of this application, controlling the media information presented in the first area to be dynamically presented is not limited to presentation effects shown in FIG. 4c and FIG. 4d, and another dynamic presentation form also falls within the protection scope of this embodiment of this application.

In this embodiment, the terminal further controls to present the first link content related to the media information in the third area of the display interface, and the first link content is used for jumping to the download interface of the media information. The third area and the second area may be a same area, or may be different areas. Certainly, the terminal further controls to present saved-electricity information and saved-traffic information in the third area after the running applications are shut down, for example, words such as "battery electricity is saved by 10%" and "traffic is saved by 1%" shown in FIG. 4c and FIG. 4d.

In this embodiment, in an implementation, the terminal controls the displaying effect of the first area when the media information is displayed to be different from that of the first area when the media information is not presented. For example, as shown in FIG. 2a to FIG. 2d and FIG. 4a to FIG. 4d, compared with FIG. 2a to FIG. 2d, the first area shown in FIG. 4a to FIG. 4d has a highlighted ring shape, that is, there is an obvious ring-shaped area at the periphery of the presented media information. The ring-shaped area may further has a highlighted display effect or a display effect matching the displayed media information content.

According to the technical solution in this embodiment of this application, on one hand, media information is presented in a first area that is inherent in a tool application, so that a user can view the pushed media information in a process of performing a corresponding function by the tool application, and there is no need to newly add an area to present the media information, thereby improving the user experience. On the other hand, a newly added media information platform (server) matches the delivered media information with user attribute information, so as to improve the accuracy of media information push and improve the controllability of the media information push. For the terminal user, browsed media information may be content in which the terminal user is interested, so that the hit rate of the media information is improved, and correspondingly, the user experience is greatly improved. For the media information platform and an advertiser, the conversion rate of the media information is improved, thereby greatly improving earnings of the advertiser.

Figure 5:
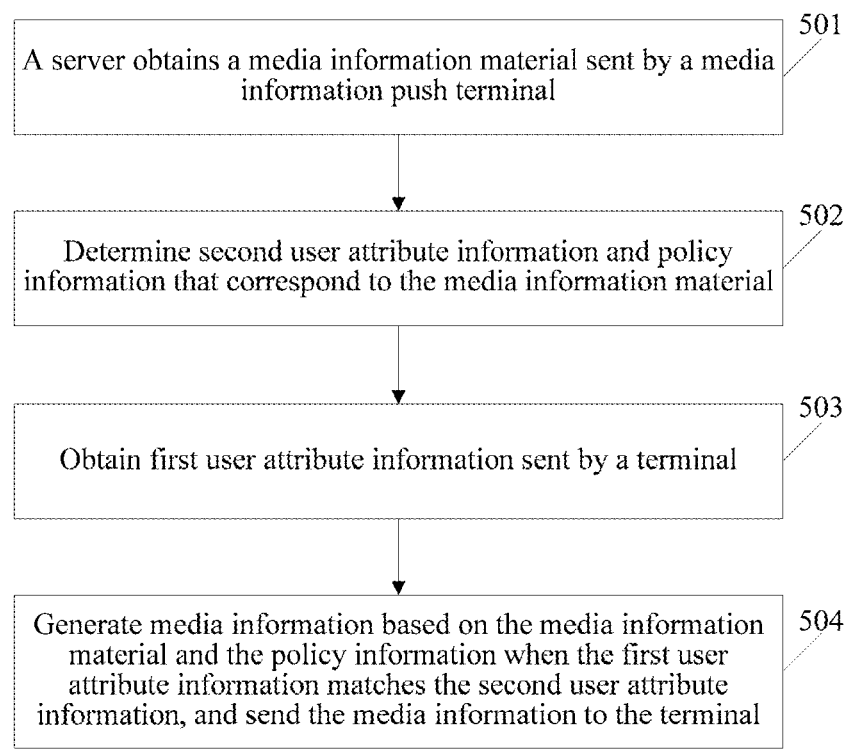
FIG. 5 is a schematic flowchart 2 of an information processing method according to an embodiment of this application.

An embodiment of this application further provides an information processing method, applied to a server. FIG. 5 is a schematic flowchart 2 of an information processing method according to an embodiment of this application. As shown in FIG. 5, the method includes the following steps:

Step 501: A server obtains a media information material sent by a media information push terminal.

Step 502: Determine second user attribute information and policy information that correspond to the media information material.

Step 503: Obtain first user attribute information sent by a terminal.

Step 504: Generate media information based on the media information material and the policy information when the first user attribute information matches the second user attribute information, and send the media information to the terminal.

In this embodiment, the server is used as a media information platform. On one hand, the server communicates with a first-type terminal (the first-type terminal being the media information push terminal such as a terminal of an advertiser and being alternatively referred to as an object providing an advertisement material and content push), to obtain the media information material. On the other hand, the server communicates with a second-type terminal (for example, a terminal in which a tool application is located, or referred to as an object to which an advertisement material is presented), to send the media information.

Figure 6:
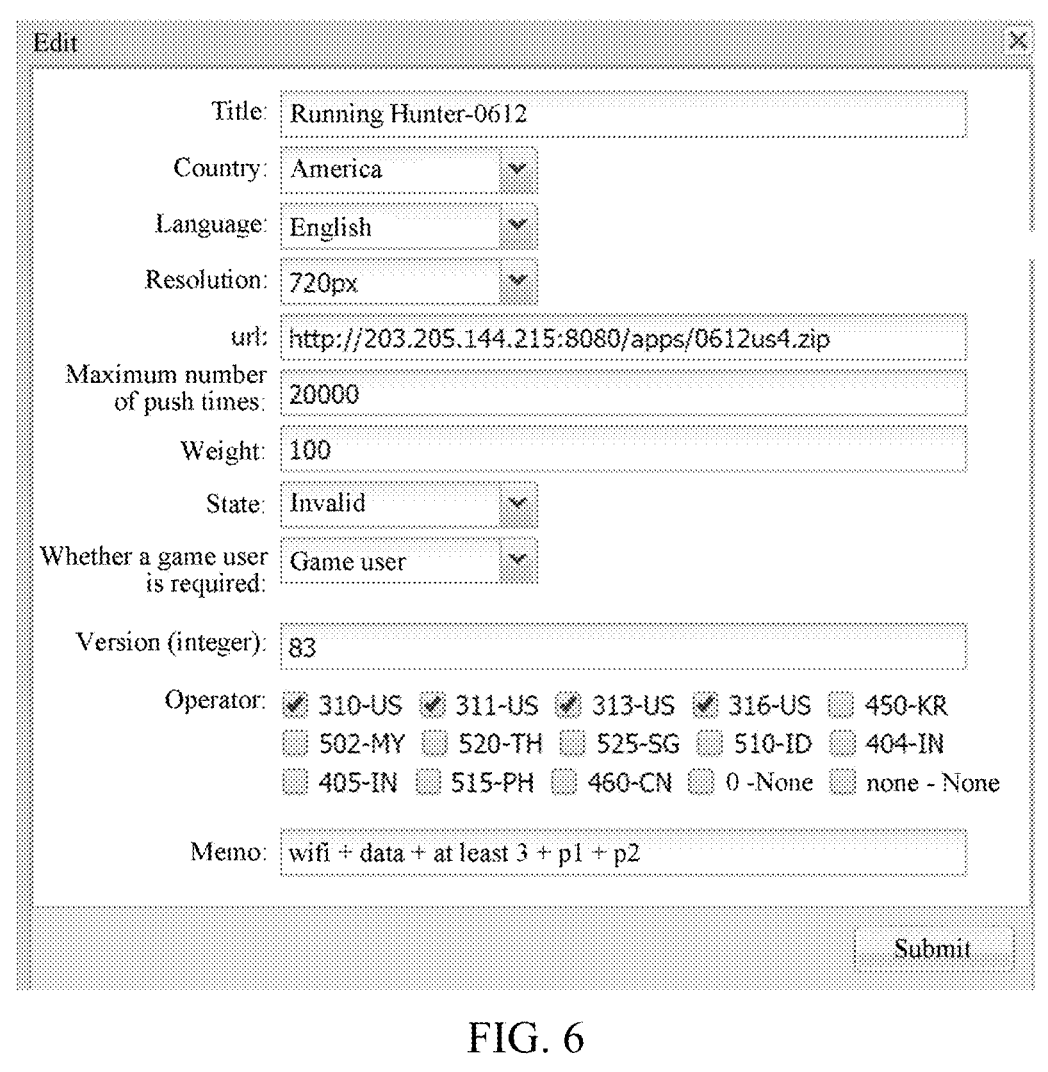

In this embodiment, the second user attribute information and the policy information may be configured by the first-type terminal and sent to the server, or may be configured by the server. The second user attribute information may specifically include at least one the following information: country information, language information, resolution information, whether a terminal user is a game user, version information of a tool application, and the like. The policy information is a policy in which the terminal downloads the media information based on download address information. The policy information may specifically include a network environment allowing the terminal to download the media information based on the download address information. For example, the network environment that is included in the policy information and that allows the terminal to download the media information based on the download address information is a Wi-Fi network environment, that is, the terminal is allowed to download the media information only in the Wi-Fi network environment. FIG. 6 is a schematic diagram of configuration according to this embodiment of this application. A configuration case of the configured second user attribute information and policy information may be shown in FIG. 6. Information corresponding to a title field indicates an identifier of to-be-delivered media information (the identifier may be a name or the like of the media information). A country field, a language field, a resolution field, a field indicating whether a game user is required, and a version number field indicate the configured second user attribute information. A "URL" field indicates the download address information. A field of the maximum number of push times indicates the number of push times of the media information. A weight field indicates a weight value of the media information. When the number of media information satisfying the first user attribute information is greater than one, to-be-delivered media information is selected by using the weight value, for example, media information having a maximum weight value is selected for delivery. A memo field indicates the policy information, and the policy information specifically includes a download policy and a presentation policy of the media information, for example, as shown in FIG. 6, "wifi" and "data" in the memo field indicate that the terminal is allowed, when being in the Wi-Fi network environment or a data traffic network environment, to download the media information according to a download address provided in the "URL" field. "At least 3" indicates that the media information is allowed to be presented after the terminal shuts down three applications; "p1" indicates that the media information is allowed to be presented before the terminal shuts down the applications; "p2" indicates that the media information is allowed to be presented after the terminal shuts down the applications; and so on. After the server obtains the media information material uploaded by the first-type terminal, a personnel to which the server belongs communicates with an advertiser of the first-type terminal, and configures configuration information shown in FIG. 6. Alternatively, the configuration information shown in FIG. 6 may be configured by the advertiser of the first-type terminal, and then sent to the server. The weight value shown in FIG. 6 may be manually configured, or a corresponding weight value may be configured based on an advertisement biding mechanism and by using a bidding result.

According to the technical solution in this embodiment of this application, on one hand, media information is presented in a first area that is inherent in a tool application, so that a user can view the pushed media information in a process of performing a corresponding function by the tool application, and there is no need to newly add an area to present the media information, thereby improving the user experience. On the other hand, a newly added media information platform (server) matches the delivered media information with user attribute information, so as to improve the accuracy of media information push and improve the controllability of the media information push. For the terminal user, browsed media information may be content in which the terminal user is interested, so that the hit rate of the media information is improved, and correspondingly, the user experience is greatly improved. For the media information platform and an advertiser, the conversion rate of the media information is improved, thereby greatly improving earnings of the advertiser.

Figure 7:
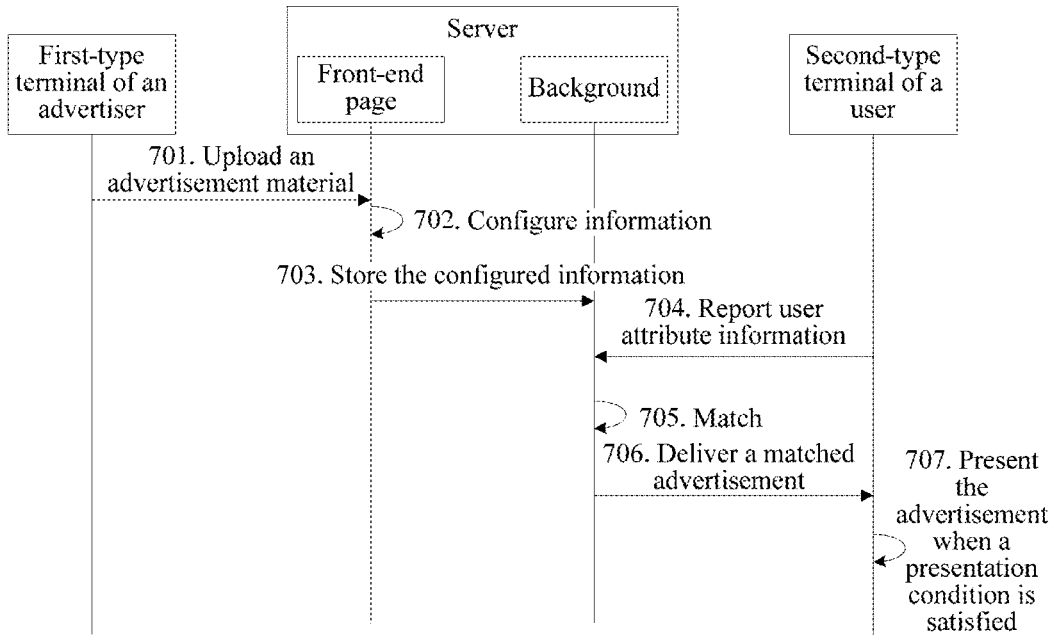
FIG. 7 is a schematic flowchart 3 of an information processing method according to an embodiment of this application.

An embodiment of this application further provides an information processing method. FIG. 7 is a schematic flowchart 3 of an information processing method according to an embodiment of this application. In this embodiment, an example in which media information content is advertisement content and a tool application is a ShutAPP application is used for detailed description. As shown in FIG. 7, in this embodiment, a first-type terminal of an advertiser is referred to as a first-type terminal for short, and a second-type terminal of a user is referred to as a second-type terminal for short. The method includes the following steps:

Step 701 and step 702: The first-type terminal uploads an advertisement material to a server by using a front-end page provided by the server, where in the uploading process, the advertiser may choose a target push crowd, that is, choose user attribute information; or may communicate with a personnel to which the server belongs, and the personnel chooses a target push crowd, that is, chooses user attribute information.

Step 703: After information is configured on the front-end page, store the information to a server background, where the configured information is, for example, shown in FIG. 6.

Step 704: The second-type terminal obtains user attribute information of the second-type terminal, and sends the obtained user attribute information to the server.

Step 705: The server matches the obtained user attribute information with user attribute information configured corresponding to the stored advertisement material, to obtain a matched advertisement material.

Step 706: The server delivers the matched advertisement to the second-type terminal, where the server delivers an advertisement data packet to the second-type terminal; the second-type terminal obtains the advertisement data packet and parses the advertisement data packet, to obtain policy information and download address information; and the second-type terminal detects a current network environment, and downloads the advertisement material through networking and by using the download address information when determining that the current network environment satisfies the policy information.

Step 707: The second-type terminal presents the advertisement material by using a first area in the ShutAPP application when a presentation condition is satisfied, and presents first text content related to the media information in a second area.

An application scenario of the information processing method in this embodiment of this application is as follows:

Due to factors such as an operating system in the terminal, usually, after the user opens an application and then exits the application, the application still runs in a background of the terminal. Therefore, a type of tool application is installed in terminals of most users. This type of tool application can shut down, with one click, all applications running in the background, so as to save electricity and traffic. This type of tool application is, for example, a "ShutAPP" application. Generally, a user needs to use this type of tool application twice or three times per day. Based on this, the information processing method in this embodiment may be applied to this type of tool application, and an advertisement is presented when the tool application is used to shut down the applications running in the background. In this way, it is ensured that the advertisement is successfully delivered and presented without relying on version update of the tool application, and the presentation rate (presentation/delivery) may reach 70%. Assuming that a presented advertisement is a game-type advertisement and a single game installation price is 1, a value of the income (ECPM) that can be obtained through every thousand times of advertisement presentation by using the tool application may reach 12.5, and the conversion rate of the advertisement is relatively high.

Figure 8:
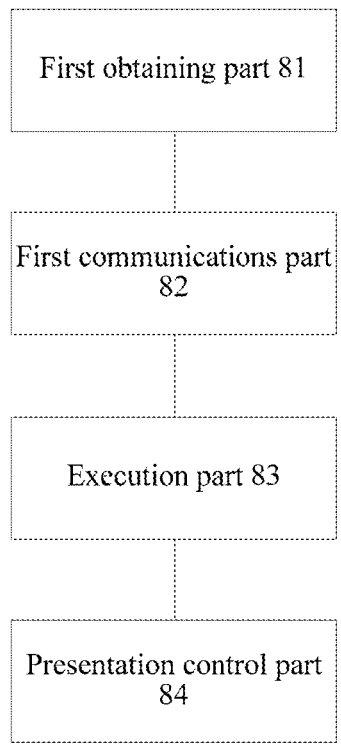
FIG. 8 is a schematic structural diagram of a terminal according to an embodiment of this application.

An embodiment of this application further provides a terminal. FIG. 8 is a schematic structural diagram of a terminal according to an embodiment of this application. As shown in FIG. 8, the terminal includes: a first obtaining part 81, a first communications part 82, an execution part 83, and a presentation control part 84.

The first obtaining part 81 is configured to obtain first user attribute information.

The first communications part 82 is configured to: send the first user attribute information obtained by the first obtaining part 81 to a server, and receive media information that is sent by the server and that matches the first user attribute information.

The execution part 83 is configured to: when a first trigger operation for a first area is detected, execute, based on the first trigger operation, a first instruction for shutting down running applications.

The presentation control part 84 is configured to: invoke the media information and present the media information in the first area when the execution part 83 executes the first instruction and a presentation condition is satisfied, and present first text content related to the media information in a second area.

In this embodiment, the first communications part 82 is configured to: receive a first media information data packet that is sent by the server and that matches the first user attribute information, and parse the first media information data packet to obtain policy information and download address information; and obtain the media information through downloading based on the download address information when it is detected that a network environment satisfies the policy information.

In an implementation, the presentation control part 84 is configured to: determine that the presentation condition is satisfied when the number of running applications that are shut down by the execution part 83 by executing the first instruction reaches the pre-configured number of shutdown applications that is included in the media information, invoke the media information and present the media information in the first area, and present the first text content related to the media information in the second area.

In an implementation, the presentation control part 84 is configured to control, when the execution part 83 executes the first instruction to shut down a first running application, a display status of the media information presented in the first area to change, to inform that the first running application has been shut down.

In an implementation, the presentation control part 84 is configured to: control, when the execution part 83 shuts down all the running applications by executing the first instruction, the media information presented in the first area to be dynamically presented, and present first link content related to the media information in a third area, where the first link content is used for jumping to a download interface of the media information.

A person skilled in the art should understand that for functions of the processing parts in the terminal in this embodiment of the present disclosure, refer to the related descriptions of the foregoing information processing method for understanding. The processing parts in the terminal in this embodiment of the present disclosure may be implemented by using an analog circuit for implementing the functions described in this embodiment of the present disclosure, or may be implemented through running of software in an intelligent terminal for performing the functions described in this embodiment of the present disclosure.

In this embodiment of this application, the first obtaining part 81, the execution part 83, and the presentation control part 84 in the terminal may all be implemented by a central processing unit (CPU), a digital signal processor (DSP), a microcontroller unit (MCU), or a field-programmable gate array (FPGA) in the terminal during actual application. The first communications part 82 in the terminal may be implemented by using a communications module (including a basic communications suite, an operating system, a communications module, a standard interface, a protocol, and the like) and a transceiver antenna during actual application.

Figure 9:
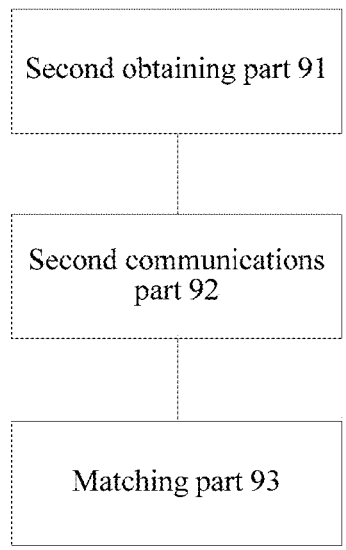
FIG. 9 is a schematic structural diagram of a server according to an embodiment of this application.

An embodiment of this application further provides a server. FIG. 9 is a schematic structural diagram of a server according to an embodiment of this application. As shown in FIG. 9, the server includes: a second obtaining part 91, a second communications part 92, and a matching part 93.

The second obtaining part 91 is configured to: obtain a media information material sent by a media information push terminal, and determine second user attribute information and policy information that correspond to the media information material.

The second communications part 92 is configured to obtain first user attribute information sent by a terminal.

The matching part 93 is configured to: match the first user attribute information with the second user attribute information, and generate media information based on the media information material and the policy information when the first user attribute information matches the second user attribute information.

The second communications part 92 is configured to send the media information to the terminal.

In this embodiment, the server is used as a media information platform. On one hand, the server communicates with a first-type terminal (that is, the media information push terminal such as a terminal of an advertiser, or referred to as an object providing an advertisement material and content push), to obtain the media information material. On the other hand, the server communicates with a second-type terminal (for example, a terminal in which a tool application is located, or referred to as an object to which an advertisement material is presented), to deliver the media information.

In this embodiment, the second user attribute information and the policy information may be configured by the first-type terminal and sent to the server, or may be configured by the server. The second user attribute information may specifically include at least one the following information: country information, language information, resolution information, whether a terminal user is a game user, version information of a tool application, and the like. The policy information is a policy in which the terminal downloads the media information based on download address information. The policy information may specifically include a network environment allowing the terminal to download the media information based on the download address information. For example, the network environment that is included in the policy information and that allows the terminal to download the media information based on the download address information is a Wi-Fi network environment, that is, the terminal is allowed to download the media information only in the Wi-Fi network environment. A configuration case of the configured second user attribute information and policy information may be shown in FIG. 6. Information corresponding to a title field indicates an identifier of to-be-delivered media information (the identifier may be a name or the like of the media information). A country field, a language field, a resolution field, a field indicating whether a game user is required, and a version number field indicate the configured second user attribute information. A "URL" field indicates the download address information. A field of the maximum number of push times indicates the number of push times of the media information. A weight field indicates a weight value of the media information. When the number of media information satisfying the first user attribute information is greater than one, to-be-delivered media information is selected by using the weight value, for example, media information having a maximum weight value is selected for delivery. A memo field indicates the policy information, and the policy information specifically includes a download policy and a presentation policy of the media information, for example, as shown in FIG. 6, "wifi" and "data" in the memo field indicate that the terminal is allowed, when being in the Wi-Fi network environment or a data traffic network environment, to download the media information according to a download address provided in the "URL" field. "At least 3" indicates that the media information is allowed to be presented after the terminal shuts down three applications; "p1" indicates that the media information is allowed to be presented before the terminal shuts down the applications; "p2" indicates that the media information is allowed to be presented after the terminal shuts down the applications; and so on. After the server obtains the media information material uploaded by the first-type terminal, a personnel to which the server belongs communicates with an advertiser of the first-type terminal, and configures configuration information shown in FIG. 6. Alternatively, the configuration information shown in FIG. 6 may be configured by the advertiser of the first-type terminal, and then sent to the server. The weight value shown in FIG. 6 may be manually configured, or a corresponding weight value may be configured based on a biding mechanism and by using a bidding result.

In this embodiment of this application, the matching part 93 in the server may be implemented by a CPU, a DSP, an MCU, or an FPGA in the server during actual application. The second obtaining part 91 and the second communications part 92 in the server may be implemented by using a communications module (including a basic communications suite, an operating system, a communications module, a standard interface, a protocol, and the like) and a transceiver antenna during actual application.

Figure 10:
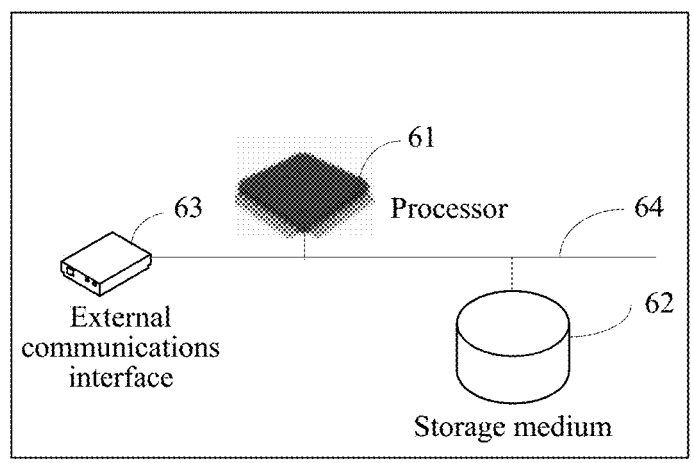
FIG. 10 is a schematic diagram of a terminal/server used as a hardware entity according to an embodiment of this application.

In an embodiment, a terminal or a server is shown in FIG. 10 as an example of a hardware entity. The terminal/server includes a processor 61, a storage medium 62, and at least one external communications interface 63. The processor 61, the storage medium 62, and the external communications interface 63 are all connected by using a bus 64. A difference between the terminal and the server used as a hardware entity is that the terminal may further include a display, and the display is connected to the processor 61 by using the bus 64.

When FIG. 10 shows a terminal, with reference to the terminal shown in FIG. 8, the first obtaining part 81, the execution part 83, and the presentation control part 84 in FIG. 8 may be implemented by using the processor 61 shown in FIG. 10, and the first communications part 82 shown in FIG. 8 may be implemented by using the external communications interface 63 shown in FIG. 10.

When FIG. 10 shows a server, with reference to the server shown in FIG. 9, the matching part 93 in FIG. 9 may be implemented by using the processor 61 shown in FIG. 10, and the second obtaining part 91 and the second communications part in FIG. 9 may be implemented by using the external communications interface 63 shown in FIG. 10.

It needs to be noted herein that the descriptions related to the terminal and the server are similar to the descriptions of the foregoing method. The descriptions of beneficial effects of the terminal and the server are the same as that of the method, and details are not described again. For technical details of the terminal and the server that are not disclosed in this application, refer to the descriptions of the method embodiments of this application.

An embodiment of this application further provides a computer storage medium, storing computer executable instructions, and the computer executable instructions being used for performing the information processing method applied to a terminal according to the embodiments of this application. Specifically, the computer executable instructions are used for performing the following steps: obtaining first user attribute information, and sending the first user attribute information to a server; receiving media information that is sent by the server and that matches the first user attribute information; when detecting a first trigger operation for a first area, executing, based on the first trigger operation, a first instruction for shutting down running applications; and invoking the media information and presenting the media information in the first area when a presentation condition is satisfied, and presenting first text content related to the media information in a second area.

In an implementation, the computer executable instructions are used for performing the following steps: receiving a first media information data packet that is sent by the server and that matches the first user attribute information, and parsing the first media information data packet to obtain policy information and download address information; and obtaining the media information through downloading based on the download address information when it is detected that a network environment satisfies the policy information.

In an implementation, the computer executable instructions are used for performing the following step: determining that the presentation condition is satisfied when the number of running applications that are shut down by executing the first instruction reaches the pre-configured number of shutdown applications that is included in the media information.

In an implementation, the computer executable instructions are used for performing the following step: controlling, when executing the first instruction to shut down a first running application, a display status of the media information presented in the first area to change, to inform that the first running application has been shut down.

In an implementation, the computer executable instructions are used for performing the following step: controlling, when the running applications are shut down by executing the first instruction, the media information presented in the first area to be dynamically presented, and presenting first link content related to the media information in a third area, where the first link content is used for jumping to a download interface of the media information.

An embodiment of this application further provides a computer storage medium, storing computer executable instructions, and the computer executable instructions being used for performing the information processing method applied to a server according to the embodiments of this application. Specifically, the computer executable instructions are used for performing the following steps: obtaining, by a server, a media information material sent by a media information push terminal; determining second user attribute information and policy information that correspond to the media information material; obtaining first user attribute information sent by a terminal; and generating media information based on the media information material and the policy information when the first user attribute information matches the second user attribute information, and sending the media information to the terminal.

A person skilled in the art should understand that the embodiments of this application may be provided as a method, a system, or a computer program product. Therefore, this application may use a form of a hardware embodiment, a software embodiment, or an embodiment combining software and hardware. Moreover, this application may use a form of a computer program product implemented on one or more computer available storage media (including but not limited to a disk memory, an optical memory, and the like) that include computer available program code.

This application is described with reference to flowcharts and/or block diagrams of the method, the device (system), and the computer program product in the embodiments of this application. It should be understood that computer program instructions can implement each process and/or each block in the flowcharts and/or the block diagrams and a combination of processes and/or blocks in the flowcharts and/or the block diagrams. These computer program instructions may be provided to a general-purpose computer, a dedicated computer, an embedded processor, or a processor of another programmable data processing device to generate a machine, so that an apparatus configured to implement functions specified in one or more processes in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more processes in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more processes in the flowcharts and/or one or more blocks in the block diagrams.

The foregoing descriptions are merely preferred embodiments of this application and are not intended to limit the protection scope of this application.

INDUSTRIAL PRACTICABILITY

According to the technical solutions in the embodiments of this application, media information is presented in a first area that is inherent in a tool application, so that a user can view the pushed media information in a process of performing a corresponding function by the tool application, and there is no need to newly add an area to present the media information, thereby improving the user experience. On the other hand, a newly added media information platform (server) matches the delivered media information with user attribute information, so as to improve the accuracy of media information push, improve the hit rate of the media information, and improve the controllability of the media information push.

What is claimed is:

1. An information processing method performed at a terminal having one or more processors and memory storing a plurality of programs to be executed by the one or more processors, the method comprising:
    in response to starting an application management tool, obtaining one or more application-specific parameters associated with the terminal;
    sending the one or more application-specific parameters to a remote server;
    receiving, from the remote server, media information that matches the one or more application-specific parameters;
    in response to a user selection of a first area of the application management tool, generating a first instruction for shutting down applications running on the terminal; and
    performing the first instruction for shutting down the applications running on the terminal while presenting the media information in the first area.

2. The method according to claim 1, wherein the receiving, from the remote server, media information that matches the one or more application-specific parameters comprises:

receiving, from the remote server, a first media information data packet that matches the one or more application-specific parameters;
extracting policy information and download address information from the first media information data packet; and
downloading the media information based on the download address information after detecting that a network environment of the terminal satisfies the policy information.

3. The method according to claim 1, wherein the presentation of the media information in the first area starts after a number of the running applications that are shut down by executing the first instruction reaches a pre-configured number of shutdown applications.

4. The method according to claim 3, wherein the pre-configured number of shutdown applications is part of the media information.

5. The method according to claim 1, wherein, when executing the first instruction to shut down a first running application, a display status of the media information presented in the first area is updated to inform that the first running application has been shut down.

6. The method according to claim 1, wherein the method further comprises:
while presenting the media information in the first area, presenting first link content related to the media information in a third area of the application management tool, wherein the first link content points to an application download interface associated with the media information.

7. The method according to claim 1, wherein the method further comprises:
presenting first text content related to the media information in a second area of the application management tool while presenting the media information in the first area.

8. A terminal, comprising: one or more processors, memory and a plurality of programs stored in the memory that, when executed by the one or more processors, cause the terminal to perform a plurality of operations including:
in response to starting an application management tool, obtaining one or more application-specific parameters associated with the terminal;
sending the one or more application-specific parameters to a remote server;
receiving, from the remote server, media information that matches the one or more application-specific parameters;
in response to a user selection of a first area of the application management tool, generating a first instruction for shutting down applications running on the terminal; and
performing the first instruction for shutting down the applications running on the terminal while presenting the media information in the first area.

9. The terminal according to claim 8, wherein the receiving, from the remote server, media information that matches the one or more application-specific parameters comprises:
receiving, from the remote server, a first media information data packet that matches the one or more application-specific parameters;
extracting policy information and download address information from the first media information data packet; and
downloading the media information based on the download address information after detecting that a network environment of the terminal satisfies the policy information.

10. The terminal according to claim 8, wherein the presentation of the media information in the first area starts after a number of the running applications that are shut down by executing the first instruction reaches a pre-configured number of shutdown applications.

11. The method according to claim 10, wherein the pre-configured number of shutdown applications is part of the media information.

12. The terminal according to claim 8, wherein, when executing the first instruction to shut down a first running application, a display status of the media information presented in the first area is updated to inform that the first running application has been shut down.

13. The terminal according to claim 8, wherein the plurality of operations further comprise:
while presenting the media information in the first area, presenting first link content related to the media information in a third area of the application management tool, wherein the first link content points to an application download interface associated with the media information.

14. The terminal according to claim 8, wherein the plurality of operations further comprise:
presenting first text content related to the media information in a second area of the application management tool while presenting the media information in the first area.

15. A non-transitory computer readable storage medium, storing computer executable instructions, and the computer executable instructions, when executed by a terminal having one or more processors, cause the terminal to perform a plurality of operations including:
in response to starting an application management tool, obtaining one or more application-specific parameters associated with the terminal;
sending the one or more application-specific parameters to a remote server;
receiving, from the remote server, media information that matches the one or more application-specific parameters;
in response to a user selection of a first area of the application management tool, generating a first instruction for shutting down applications running on the terminal; and
performing the first instruction for shutting down the applications running on the terminal while presenting the media information in the first area.

16. The non-transitory computer readable storage medium according to claim 15, wherein the receiving, from the remote server, media information that matches the one or more application-specific parameters comprises:
receiving, from the remote server, a first media information data packet that matches the one or more application-specific parameters;
extracting policy information and download address information from the first media information data packet; and
downloading the media information based on the download address information after detecting that a network environment of the terminal satisfies the policy information.

17. The non-transitory computer readable storage medium according to claim 15, wherein the presentation of the media information in the first area starts after a number of the running applications that are shut down by executing the first instruction reaches a pre-configured number of shut-down applications.

18. The non-transitory computer readable storage medium according to claim 15, wherein, when executing the first instruction to shut down a first running application, a display status of the media information presented in the first area is updated to inform that the first running application has been shut down.

19. The non-transitory computer readable storage medium according to claim 15, wherein the plurality of operations further comprise:
   while presenting the media information in the first area, presenting first link content related to the media information in a third area of the application management tool, wherein the first link content points to an application download interface associated with the media information.

20. The non-transitory computer readable storage medium according to claim 15, wherein the plurality of operations further comprise:
   presenting first text content related to the media information in a second area of the application management tool while presenting the media information in the first area.

* * * * *